United States Patent
Harwood

(10) Patent No.: US 6,778,093 B2
(45) Date of Patent: Aug. 17, 2004

(54) SYSTEM FOR PROVIDING PATHWAY INDICATIONS THROUGH UNIT AREAS

(76) Inventor: Ronald P. Harwood, 31110 Applewood, Farmington Hills, MI (US) 48331

( * ) Notice: Subject to any disclaimer, the term of this patent is extended or adjusted under 35 U.S.C. 154(b) by 117 days.

(21) Appl. No.: 10/202,746

(22) Filed: Jul. 25, 2002

(65) Prior Publication Data

US 2003/0021106 A1 Jan. 30, 2003

Related U.S. Application Data

(60) Provisional application No. 60/307,947, filed on Jul. 26, 2001.

(51) Int. Cl.[7] .............................................. G08B 23/00
(52) U.S. Cl. ............... 340/693.1; 315/149; 340/815.45; 340/907; 362/183
(58) Field of Search ..................... 340/391.1, 691.4, 340/693.1, 332, 907, 908, 908.1, 815.45; 362/800, 145, 157, 183

(56) References Cited

U.S. PATENT DOCUMENTS

| | | | | |
|---|---|---|---|---|
| 4,384,317 A | * | 5/1983 | Stackpole | 362/183 |
| 4,903,172 A | * | 2/1990 | Schoniger et al. | 362/31 |
| 5,152,601 A | * | 10/1992 | Ferng | 362/183 |
| 5,523,929 A | * | 6/1996 | Ogihara | 362/183 |
| 5,537,111 A | * | 7/1996 | Martin et al. | 340/983 |
| 5,782,552 A | * | 7/1998 | Green et al. | 362/183 |
| 5,984,570 A | * | 11/1999 | Parashar | 404/14 |
| 6,013,985 A | * | 1/2000 | Green et al. | 315/149 |
| 6,226,933 B1 | * | 5/2001 | Nelson et al. | 52/101 |
| 2001/0055206 A1 | * | 12/2001 | Liao et al. | 362/183 |
| 2002/0027510 A1 | * | 3/2002 | Jones et al. | 340/907 |

FOREIGN PATENT DOCUMENTS

JP    2002-15610    * 1/2002

* cited by examiner

Primary Examiner—Thomas J Mullen
(74) Attorney, Agent, or Firm—Marshall & Melhorn, LLC

(57) ABSTRACT

An auxiliary lighting system contains at least one photoelectric cell to convert ambient light into energy and at least one light emitting diode. The photoelectric cell converts ambient light into energy which is stored in a storage cell. A switching system provides energy from the storage cell to the light emitting diode upon certain conditions, generally by time or by lack of ambient light.

5 Claims, 1 Drawing Sheet

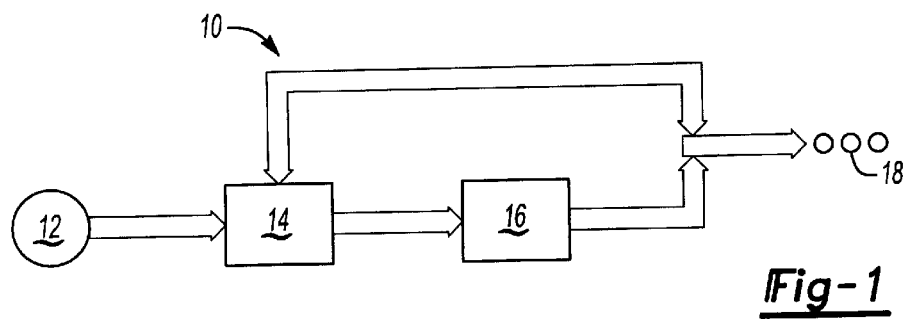
*Fig-1*
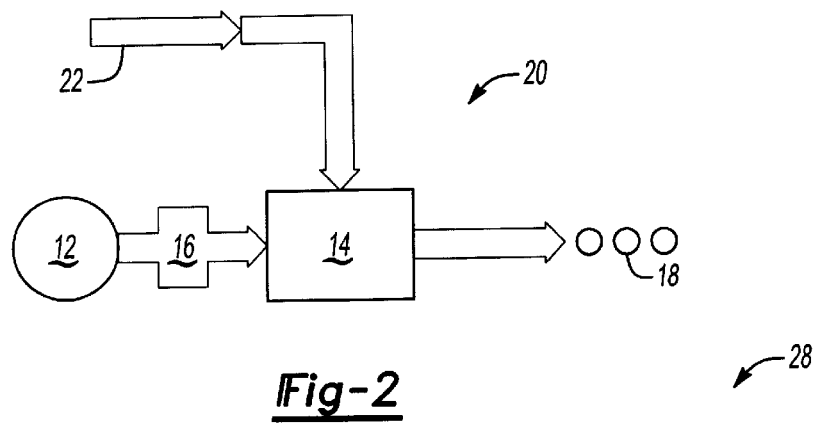
*Fig-2*
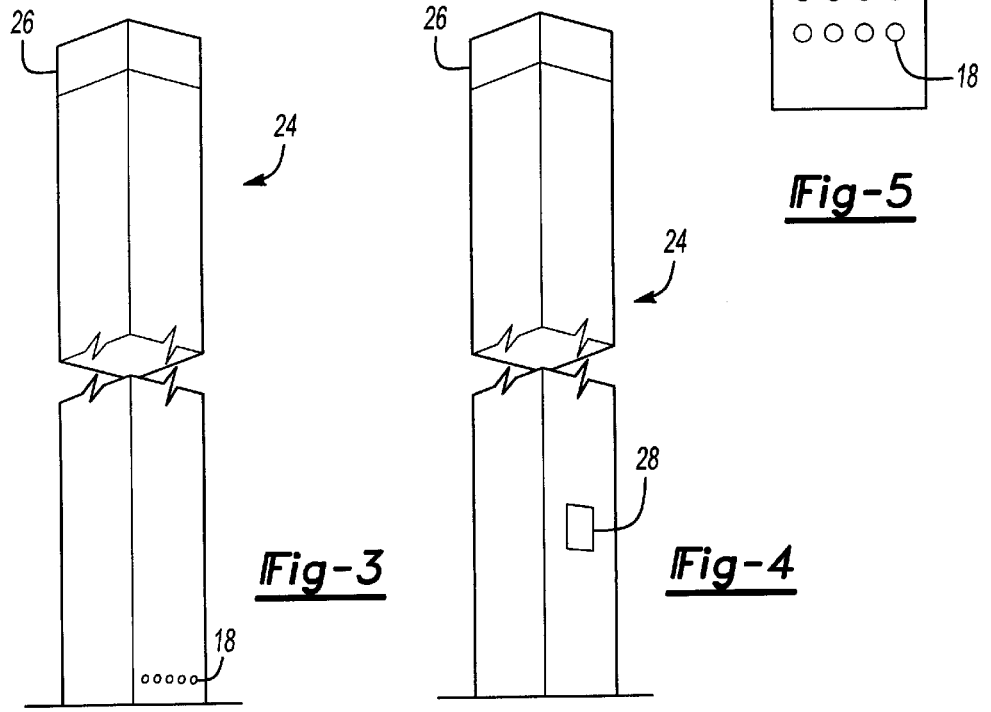
*Fig-3*
*Fig-4*
*Fig-5*

SYSTEM FOR PROVIDING PATHWAY INDICATIONS THROUGH UNIT AREAS

This application is claiming the benefit, under U.S.C. §119(e), of the provisional application filed Jul. 26, 2001 under 35 U.S.C. §111(b), which was granted Serial No. 60/307,947. The provisional application No. 60/307,947 is hereby incorporated by reference.

BACKGROUND OF THE INVENTION

1. Field of the Invention

The present invention relates to an improved system for providing pathway indication through unlit areas. For example, outdoor parking lots are often illuminated by light poles which, for economic reasons, are often designed to be automatically turned off after a set time, for example midnight. After this shut-off time, navigating or exiting the parking lot can be extremely hazardous. In fact, the light poles themselves can be a significant obstacle to safe egress of the parking lot.

2. Summary of Related Art

U.S. Pat. No. 4,801,928 discloses an egress direction indication system utilizing an indicator with at least three electroluminescent lamps in a linear arrangement and circuitry for sequentially illuminating the lamps on a repeating basis, in order, from one end of the linear arrangement to the other. The lamps are mounted on a circuit board with a lens covering the lamps. The circuitry lights in a first direction under one sensed condition and lights in a second direction in a different sensed condition.

U.S. Pat. No. 5,815,068 discloses a light system with controllable light sources positioned along alternative routes of movement to serve as an optical means for influencing people to follow an indicated route to a selected area. A command system allows a selection to be made controlling the direction of movement to be indicated. Light emitting diodes (LEDs) are a preferred light source.

U.S. Pat. No. 5,343,375 discloses an emergency egress illuminator and marking light strip. This patent teaches a system for the lighting of a floor of an emergency egress passageway during clear air conditions and also marks an emergency escape path. The system utilizes two narrow strings of narrow cone LEDs each in a transparent tubular housing, which is mounted on the passageway wall.

While these systems are suitable for their intended purposes, they are not ideally designed for applications such as described above. This is because the present invention provides improved energy efficiency over the systems known in the art, and is thus more economical. Additionally, the present invention is optimized to operate in conditions of power failure or other interruptions of main power supply.

Therefore, it is an object of the present invention to provide an economical lighting system to allow safe egress from a darkened area, such as a parking lot, when a primary light system is unavailable.

SUMMARY OF THE INVENTION

In accordance with the present invention, there is provided a photocell for converting sunlight into electrical energy and a storage cell for storing that energy for a future time. The photocell and the storage cell may be combined into the same unit, but this is not necessary. The storage device is connected, by way of a switching apparatus, to an LED or series of LEDs which provide sufficient light to illuminate the darkened area sufficiently to allow safe egress from the darkened area.

BRIEF DESCRIPTION OF THE DRAWINGS

The above, as well as other advantages of the present invention, will become readily apparent to those skilled in the art from the following detailed description when considered in light of the accompanying drawings in which:

FIG. 1 illustrates a schematic diagram of an electrical system in accordance with the present invention;

FIG. 2 illustrates a schematic diagram of an alternative electrical system in accordance with the present invention;

FIG. 3 illustrates a light pole utilizing the present invention;

FIG. 4 illustrates a light pole utilizing an alternative embodiment of the present invention; and FIG. 5 illustrates an enlarged view of a self contained unit shown in the light pole in FIG. 4.

DETAILED DESCRIPTION OF THE PREFERRED EMBODIMENT

FIG. 1 illustrates an auxiliary lighting system 10 according to the present invention. The auxiliary lighting system 10 includes a photoelectric collector 12 positioned in such a manner as to receive a maximal amount of sunlight. If the auxiliary lighting system is to be used indoors, the collector could be placed indoors, in a place where it will be exposed to light, or it can be placed outdoors. The photoelectric collector 12 is then connected to an auto-switching energy sensor 14. The sensor 14 is then connected to one or more electrical storage devices 16. The storage devices 16 can then be connected to one or more LEDs 18 as the light source of the auxiliary lighting system 10. The sensor 14 can also provide an additional electric pathway directly from the photoelectric collector 12 to the LEDs 18.

FIG. 2 illustrates a modification of the present invention, shown as the auxiliary lighting system 20. In this embodiment, the photoelectric collector 12 is connected to the energy storage device 16. The energy storage device 16 is then connected to the sensor 14. The sensor 14 is also connected to a primary power source 22. Finally, the sensor provides an electrical connection to the LEDs 18. In this embodiment, the sensor can switch the LEDs 18 between the main source of outside power 22 and the auxiliary source, the storage device 16. This could be done, for example, after the main power source 22 is switched off for the night, or upon a failure of the main power source 22. In an alternative not shown in this figure, the main power source 22 could be connected to a different light source, specifically one generating more light than the LEDs 18.

Thus when the sensor 14 sees that main power is on, the main lights are turned on, and when main power is turned off, for example by timer or upon an interruption in main power, the stored power 16 is then connected via the switch 14 to the LEDs 18.

FIG. 3 illustrates an embodiment of the present invention as utilized in a light pole 24 for a parking lot. The light pole 24 has a main lighting source 26, and additionally has LEDs 18, located near the bottom of the pole. The LEDs 18 can be connected to a photoelectric collector and switch (see FIG. 2) and &an be turned on when the main light source 26 is disengaged. The location of the LEDs 18 near the bottom of the light pole 24 is suitable to allow individuals to see the location of the pole 24 in the darkened parking lot.

FIG. 4 illustrates a variation of the embodiment shown in FIG. 3. In FIG. 4, the auxiliary lighting unit is maintained as a separate system 28 (see FIG. 5) which is inserted into a recess in the light pole. The system 28 can be originally designed into the light pole 24 or can be retrofitted into it subsequent to the pole's initial construction. The system includes the photoelectric collector 12 along with a sensor 14 and LEDs 18. The sensor can work as described above, either by time, lack of main power, or additionally, by sensing the level of ambient light, and turning on the LEDs only when the ambient light is low enough to indicate that the primary light 24 is inactive. This would provide illumination at times when the main light 24 should be engaged but is not, for example upon burnout of the main light bulb.

While exterior applications of the light system are described above, further applications are envisioned, both exterior and interior. The present invention is suitable for use anywhere a lighting system is necessary. Because of its use of lower energy using LEDs and stored solar power, the system is extremely economical compared to known auxiliary or emergency lighting systems.

In accordance with the provisions of the patent statutes, the present invention has been described in what is considered to represent-its preferred embodiment. However, it should be noted that the invention can be practiced otherwise than as specifically illustrated and described without departing from its spirit or scope.

What is claimed is:

1. An exterior light pole for providing light to a darkened area comprising:

a pole with at least one light fixture attached;

a primary source of power to provide electricity to said at least one light fixture;

at least one light emitting diode affixed on said pole;

a photoelectric cell to convert ambient light to electricity;

at least one storage device to store electricity from said photoelectric cell; and a switching device to supply power to said at least one light emitting diode from said at least one storage device.

2. The exterior light pole according to claim 1, further comprising a sensor, said sensor being configured to actuate said switching device to provide electricity to said at least one light emitting diode upon the ambient light dropping below a predetermined level.

3. The exterior light pole according to claim 1, wherein said switching device is configured to automatically supply power from said at least one storage device to said at least one light emitting diode upon the cessation of power to said at least one light fixture.

4. The exterior light pole according to claim 1, wherein said at least one light emitting diode, said switching device, said photoelectric cell and said at least one storage device are combined into a single unit.

5. The exterior light pole according to claim 1, wherein said at least one light emitting diode is located near the bottom of the light pole.

* * * * *

UNITED STATES PATENT AND TRADEMARK OFFICE
CERTIFICATE OF CORRECTION

PATENT NO.     : 6,778,093 B2           Page 1 of 1
DATED          : August 17, 2004
INVENTOR(S)    : Ronald P. Harwood It is certified that error appears in the above-identified patent and that said Letters Patent is hereby corrected as shown below:

<u>Title page,</u>
Item [54], Title, delete "UNIT" and replace with -- UNLIT --.

Signed and Sealed this

Second Day of May, 2006

JON W. DUDAS
*Director of the United States Patent and Trademark Office*